United States Patent [19]
Chelminski

[11] 3,779,335
[45] Dec. 18, 1973

[54] CONFINED-LIQUID SEISMIC EXPLORATION METHODS AND SYSTEMS

[75] Inventor: Stephen V. Chelminski, West Redding, Conn.

[73] Assignee: Bolt Associates, Inc., Norwalk, Conn.

[22] Filed: Feb. 14, 1972

[21] Appl. No.: 225,851

Related U.S. Application Data

[63] Continuation of Ser. No. 851,268, Aug. 19, 1969, abandoned.

[52] U.S. Cl........ 181/.5 NC, 181/.5 VM, 181/.5 EC
[51] Int. Cl............................................. G01v 1/14
[58] Field of Search .................... 181/.5 EC, .5 VM, 181/.5 NC

[56] References Cited
UNITED STATES PATENTS

| | | | |
|---|---|---|---|
| 3,310,128 | 3/1967 | Chelminski..................... | 181/.5 VM |
| 3,347,336 | 10/1967 | Nash .............................. | 181/.5 NC |

Primary Examiner—Benjamin A. Borchelt
Assistant Examiner—J. V. Doramus
Attorney—Roland T. Bryan et al.

[57] ABSTRACT

Confined-liquid seismic exploration methods and systems in which powerful sound impulses are generated by the abrupt release of confined gases into a confined liquid that is coupled to the earth in vibration transmitting relationship during the brief period of time while these impulses are being transmitted into the earth. The repeatability of the powerful impulses is enhanced by permitting the entire mass of confined liquid to jump upwardly in reaction to the powerful impulses transmitted into the earth. Weight may be added to increase the intensity of the impulses transmitted into the earth. After the mass jumps into the air, it is then restrained from immediately returning to the earth, thus avoiding spurious "bouncing" impulses such as would occur if the liquid mass were allowed to fall back freely to earth. Total confinement of the liquid is provided thus intensifying the seismic impulses transmitted per unit volume of the liquid, enabling a relatively compact system to be utilized. The abruptly released gases are separated from the totally confined liquid in preparation for the next "shot" to be fired. The methods and systems described are conveniently applicable to many different types of sites, enabling a single survey crew to carry out highly effective survey work on hard ground, soft ground, marshy or swampy ground or submerged ground, as it is encountered on the job site.

25 Claims, 11 Drawing Figures

3,779,335

CONFINED-LIQUID SEISMIC EXPLORATION METHODS AND SYSTEMS

CROSS REFERENCE TO RELATED APPLICATION

This application is a continuation of application Ser. No. 851,268, filed Aug. 19, 1969, now abandoned.

DESCRIPTION

The present invention relates to confined-liquid seismic exploration methods and systems and particularly to exploration methods and systems utilizing powerful sound impulses which are generated by the abrupt release of confined gases into a confined liquid which in turn is coupled to the earth in vibration transmitting relationship.

This invention is an improvement over the methods and systems disclosed in U.S. Pat. No. 3,310,128, issued on Mar. 21, 1967, to which attention is invited as background information.

Among the many advantages of the seismic exploration methods and systems for survey of the earth which are described herein as illustrative embodiments of the present invention are those resulting from the fact that very powerful seismic impulses are transmitted into the earth at a desired site; these impulses can be repeated at frequent intervals as may be desired; and their intensity is high. The amount of seismic energy transmitted into the earth from the relatively compact unit is enormous, and the reaction forces are permitted to cause the seismic source to jump upwardly. The source is prevented from falling freely back to earth so that spurious "bounce" impulses are avoided. Also, where highly sensitive techniques are used for sensing the resulting earth vibrations, it is an advantage to prevent the source from falling back freely onto the earth because spurious vibrations or signals are avoided which might otherwise be caused by sloshing of the confined liquid mass. The source is lowered onto the earth a short while later after the agitation of the liquid mass has quieted.

A compact system is provided which is convenient for mobile applications, and yet which is capable of transmitting intense vibrational impulses into the earth for seismic surveying. The resulting reflected and refracted vibrational impulses in the earth are sensed by suitable sensing devices which are known in the art, and in this way information is obtained about the conditions and characteristics of the geologic formations in the region being surveyed.

Advantageously, the present invention enables a relatively compact mass of confined liquid to transmit intense acoustical impulses into the earth while avoiding spurious bounce or sloshing signals. Thus, powerful, accurately-repeatable seismic vibrational impulses are transmitted into the earth which are valuable for analysis and correlation to improve the ultimate effective signal-to-noise ratio obtained when analyzing and correlating the resultant earth tremors sensed at a distance.

Also, the illustrative methods and systems which are described herein as embodying the invention enable powerful and repeatable seismic vibrational impulses to be transmitted into the earth at a desired site by the use of relatively compact and readily transportable apparatus without requiring any special preparation of the earth at the site.

Among the further advantages of the methods and systems embodying the present invention are that they enable seismic surveying and exploration to be carried out conveniently and effectively at many different types of geographic sites, having a vast range of surface conditions, for example, at sites involving hard ground or soft ground or marshy or swampy ground or submerged ground, etc. Thus, a survey crew can carry on efficient and effective seismic surveying and exploration regardless of the surface conditions which are encountered during their survey operations. In the prior art there are devices which are capable of being used on dry land but which are not capable of doing effective work on soft ground or in marshy or swampy ground or in submerged areas. This invention enables them all to be surveyed by the same crew using the same equipment.

The various objects, aspects and advantages of the present invention will become more fully understood from the following description of presently preferred embodiments of the invention, when considered in conjunction with the accompanying drawings, in which:

Figure 1:
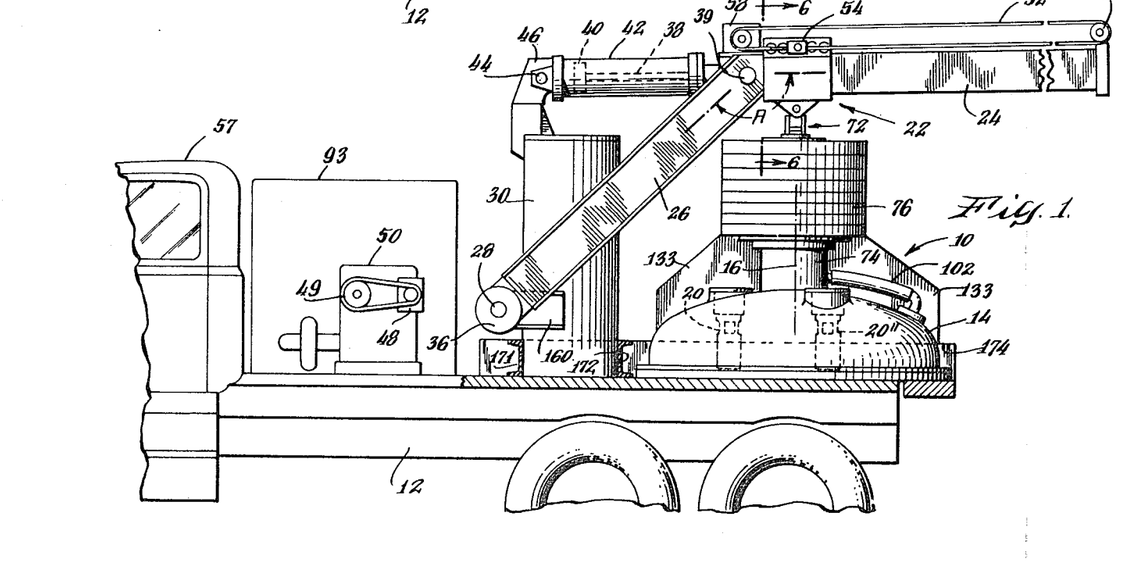
FIG. 1 is a side elevational view of a mobile seismic survey system for practicing the methods of the invention; with a seismic source located in its carrying position on a vehicle for transportation to a site to be surveyed.
Figure 2:
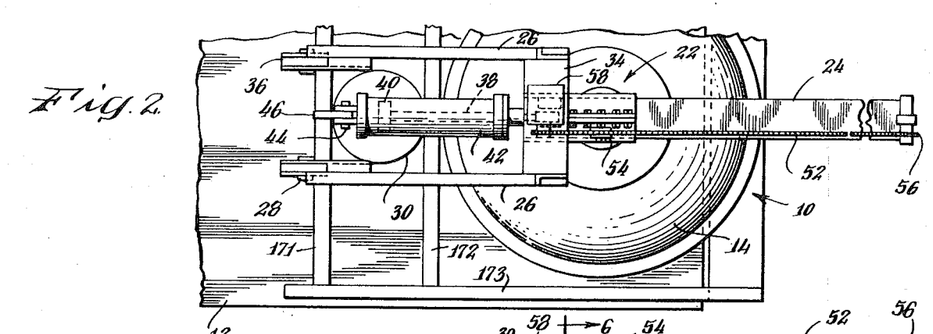
FIG. 2 is a top plan view of a rear portion of the vehicle in the mobile system of FIG. 1.
Figure 3:
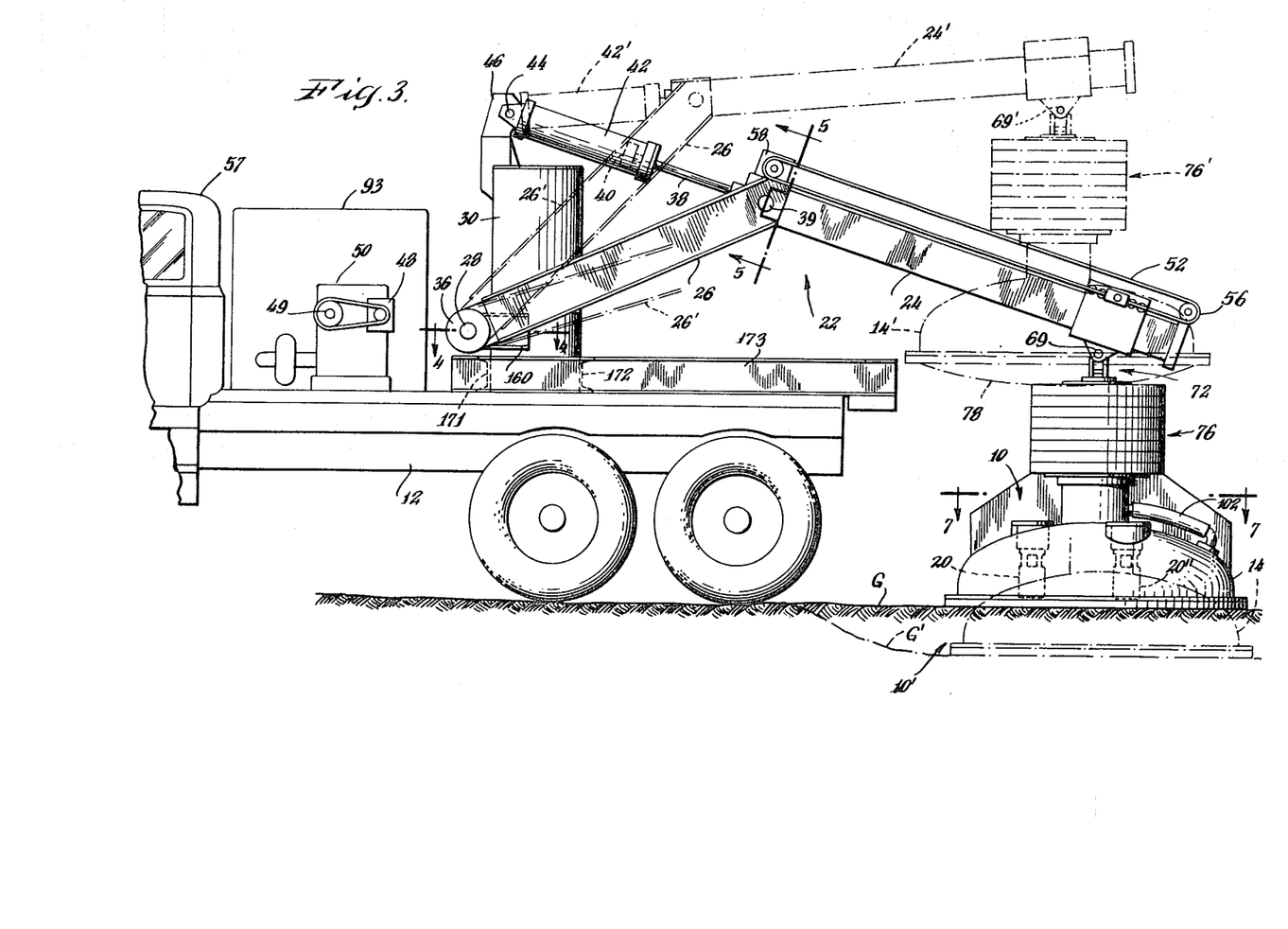
FIG. 3 is a side elevational view corresponding to FIG. 1 of the seismic surveying system showing seismic wave generator apparatus in the earth contacting position, as well as shown in dashed outline in the alternative raised position to avoid spurious "bounce" impulses or sloshing signals.

With reference to FIGS. 1, 2 and 3, a mobile seismic survey system is shown including seismic wave generator apparatus 10. In FIG. 1 the seismic wave generator apparatus 10 is shown positioned on the bed of a vehicle 12 for transportation to a desired area to be seismically surveyed, and in FIG. 3 the apparatus 10 is shown operatively employed over a location beside the vehicle 12. The seismic wave generator apparatus 10 includes a closed dome-shaped tank 14 having an upright axis of symmetry 16. The tank 14 contains a substantially noncompressible liquid 18 (please see FIG. 8) such as water in confined relationship. Mounted within the liquid near the bottom of the tank are acoustical air gun repeaters 20 similar to those abrupt impulse release repeaters shown in U.S. Pat. No. 3,310,128, referred to above, and also shown in U.S. Pat. No. 3,378,273, and which are now sometimes called air guns. Each of these air guns has a release chamber volume of, for example a size between 40 cubic inches and 200 cubic inches in this embodiment.

The purpose of this air gun repeater 20 is to repetitively release a large quantity of high pressure gas abruptly into the liquid 18 to generate powerful impulses which are transmitted as powerful seismic waves into the earth. The seismic wave producing apparatus 10 is attached to the vehicle 12 by means of a pivotally supported arm structure 22 composed of a cantilever mounted boom 24 firmly affixed at an angle A to a pair of parallel spaced channel arms 26 which are pivotally mounted at pivot axis 28 to a support structure 30 on the vehicle 12. As more clearly seen in the FIG. 2, the channel arms 26 are connected to one another at their respective ends, i.e., by means of a cross beam 34 welded to the channel arms 26 at their one end and by means of a shock absorber assembly 36 at their other end. The cantilever boom 24 is made of steel in the shape of a box beam and it is sized to extend aft of the vehicle 12 sufficiently far for supporting the seismic wave generator apparatus 10 for placement on the ground behind the vehicle, as is illustrated in FIG. 3. The boom 24 is affixed to the center of the cross beam 34.

The raising and lowering of the pivotally supported structure 22 is accomplished by lift means including a hydraulically actuated control shaft 38 connected to a pivot axis 39 which is secured to the boom 24. The lifting position of the shaft 38 is controlled by a piston 40 directly connected to an end of the shaft 38 and operatively located within a hydraulic cylinder 42. The cylinder 42 in turn is connected to a pivot axis 44 mounted on a strong bracket 46 on the vehicle support structure 30. The pivot axes 28, 39 and 44 are parallel to one another.

Figures 10, 11:
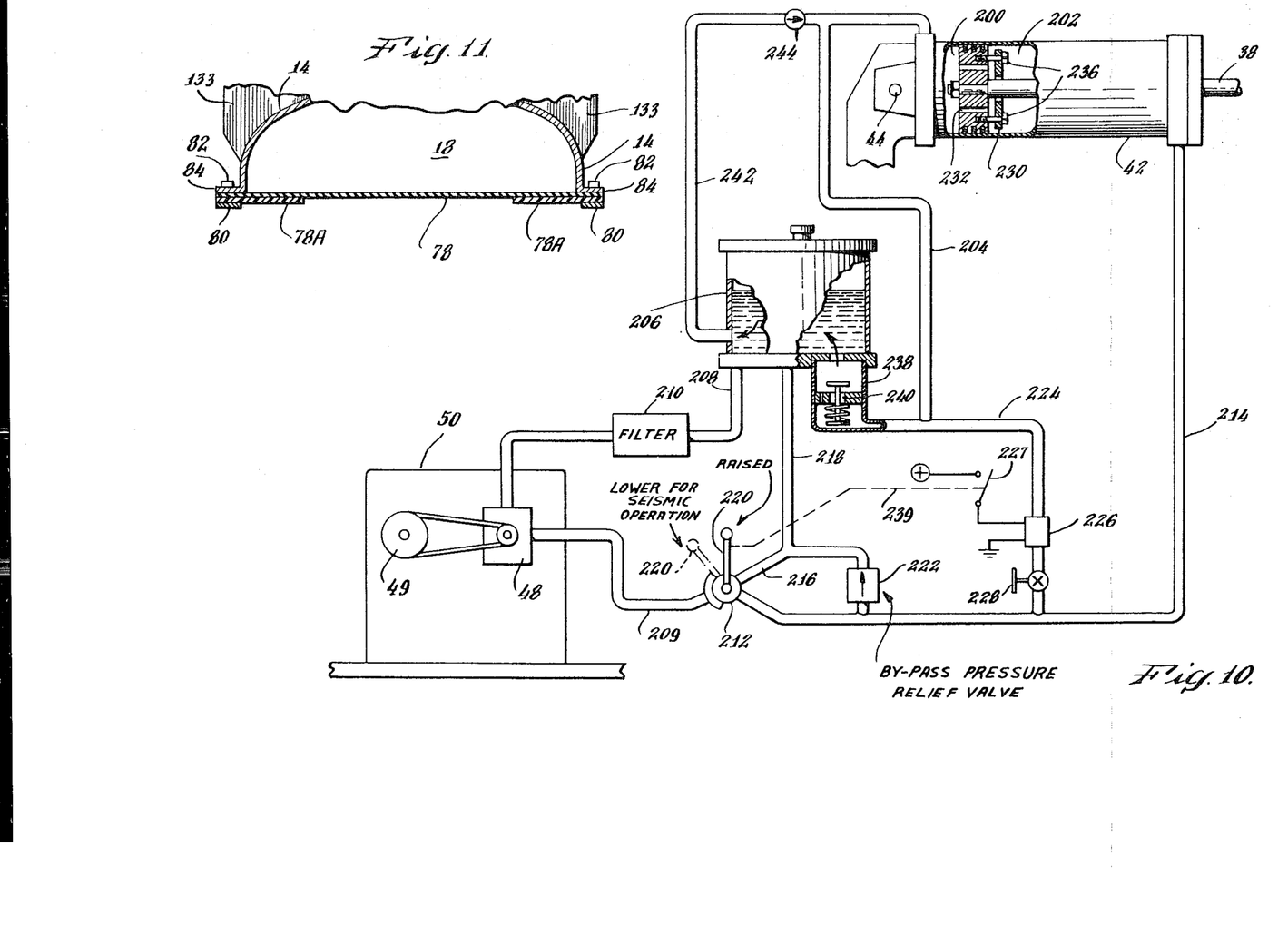
FIG. 10 is a schematic diagram of the hydraulic and actuating mechanism employed to position the seismic wave generator on the vehicle for transportation, or on the ground for seismic surveying or for temporarily holding the generator in raised position during operation.
FIG. 11 is a side elevational sectional view showing a preferred construction of the diaphragm.

The hydraulic pressure for the control of the position of the piston 40 in the cylinder 42 is obtained from a hydraulic pump 48 (FIG. 1) driven by an engine 50 located on the vehicle 12. Hydraulic lines, to the cylinder 42, a hydraulic fluid reservoir as well as a hydraulic control mechanism are provided on the vehicle 12 as shown in FIG. 10 and will be further explained in conjunction with FIG. 10. In operation the hydraulic system cooperates with the seismic wave generator apparatus 10 to "catch" or restrain the latter at an intermediate raised position after air gun actuation, as indicated by the dashed outline of the apparatus shown in FIG. 3, in a manner as will be explained further below.

Figure 5:
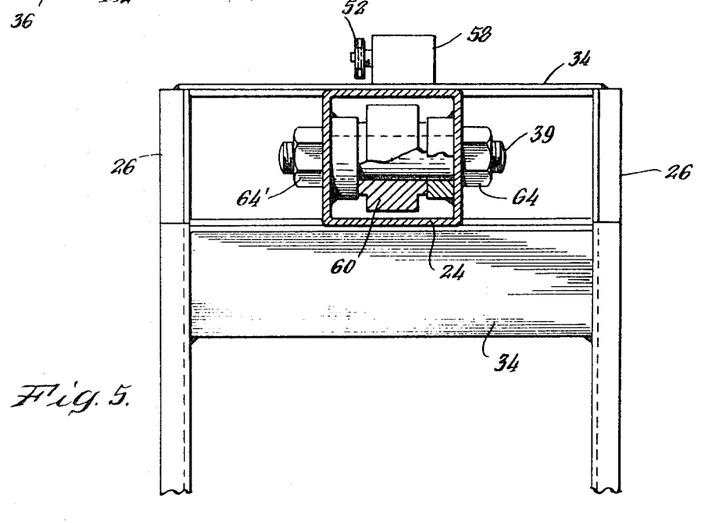
FIG. 5 is a sectional view of the pivot arm support assembly used to raise and lower the seismic wave generating apparatus retaining the confined mass of liquid, taken along the line 5—5 in FIG. 3.

The pivot connection of the piston shaft 38 to the box beam boom 24 is provided as shown in FIG. 5. The shaft 38 terminates with a strong steel sleeve bearing 60 oriented to rotate about a cross shaft 39 held by nuts 64,64' within aligned apertures in opposite walls of the boom 24. Hence, as the cylinder 42 and the piston 40 are actuated to lower or raise the seismic wave generator apparatus 10, the arms 26 pivot about the axis 28, while the cylinder 42 and piston rod 38 both pivot about the axes 39 and 44.

The seismic wave generator apparatus 10 may be slidably moved along the boom 24 by means of a chain 52 (FIGS. 1, 3 and 4) located above the boom 24. The chain 52 is affixed to the apparatus 10 at 54 and extends along the beam 24 with a sprocket 56 at the far end and a motor 58 at the near end. The motor 58 is controlled from within the cab 57 of the vehicle 12.

Figure 6:
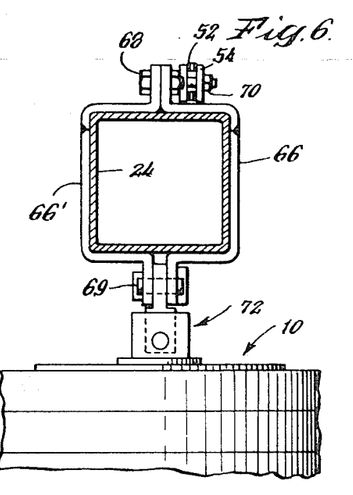
FIG. 6 is an enlarged sectional view of the mounting of the seismic wave generating apparatus to the pivot arm support assembly, taken along the line 6—6 in FIG. 1.

FIG. 6 illustrates the coupling of the seismic wave generator apparatus 10 to the box beam 24. A rectangular channel section or sleeve is formed between opposing clamps 66—66'. The channel section is sized to snugly, but slidably enclose the box beam 24 when the clamps 66—66' are connected with suitable bolts 68 and 69 located both above and below the beam 24. The exterior of the boom 24 may be greased to facilitate sliding. The upper bolt 68 further functions to attach the seismic wave generator to the chain 52 with a clamp 54 and nut 70 to provide movement along beam 24. The lower bolt 69 further functions to pivotally support the seismic wave generator 10 about an axis which is parallel with the other pivot axes 28, 39 and 44 to assure proper ground-conforming mounting of the bottom of the tank 14 during seismic surveying and during transport of the tank 14 in the horizontal position on the vehicle 12.

As seen in the FIGS. 1, 3 and 6 below the bolt 69 is a heavy steel bracket assembly 72 which connects to a cylindrical baffle assembly 74 secured to the top of the tank 14 and surrounded at the upper end with cylindrically shaped weight mass 76.

Figures 7, 8, 9:
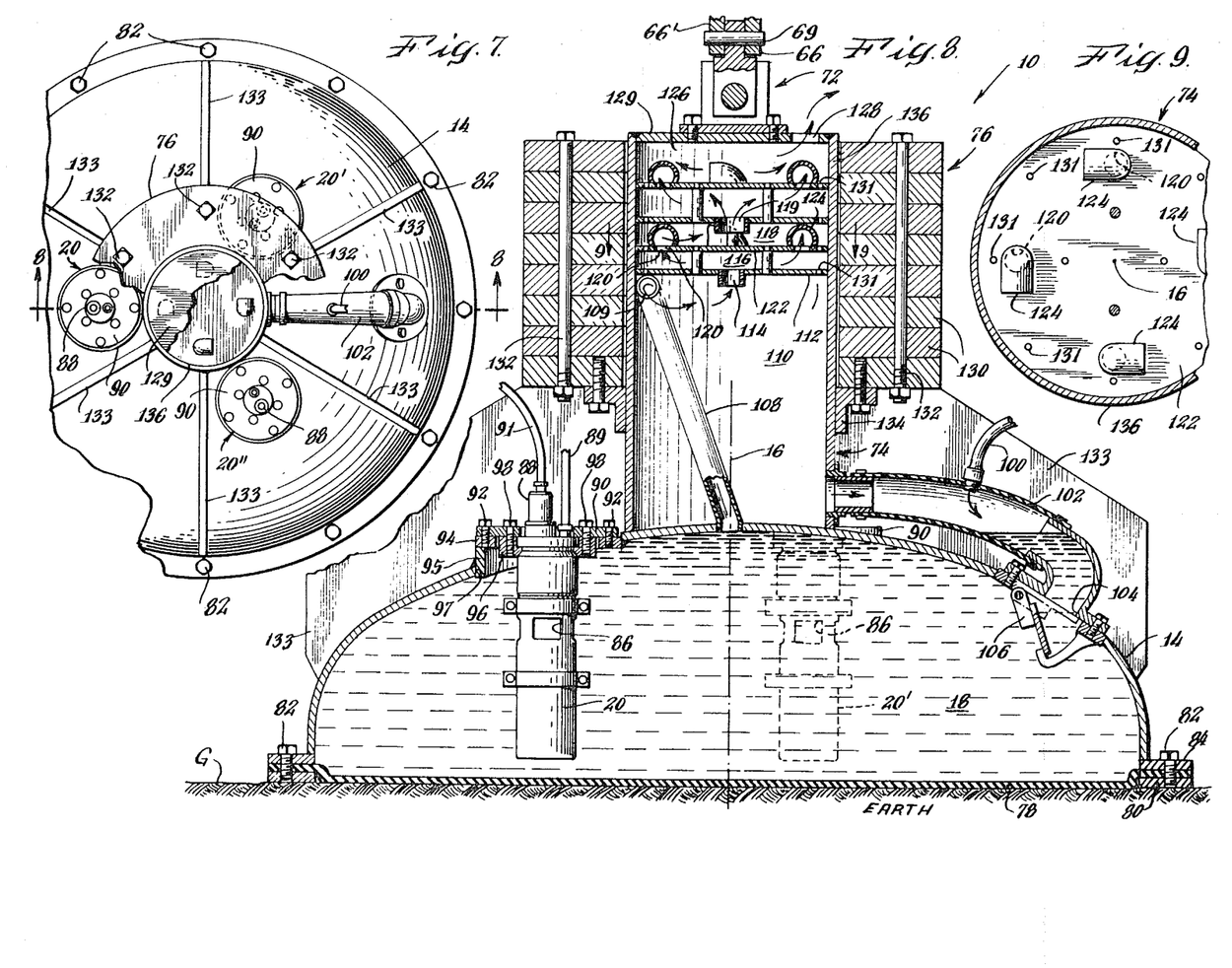
FIG. 7 is an enlarged plan view of a portion of the apparatus employed to retain the liquid mass in the seismic wave generator being a view taken along the line 7—7 in FIG. 3.
FIG. 8 is an enlarged side elevational sectional view of the seismic wave generator, taken along the line 8—8 in FIG. 7.
FIG. 9 is a plan sectional view of the gas-and-liquid separation baffle assembly employed with the seismic wave generator, taken along the line 9—9 of FIG. 8.

With further reference to FIG. 8, additional aspects of the seismic wave generator apparatus 10 are illustrated. The tank 14 as described is dome-shaped with circular symmetry, i.e. it has an oblate hemispherical configuration. The tank has a high strength, rigid wall made of steel or aluminum, while the bottom 78 is formed of a flexible ground-conforming material. The bottom end 78 of the tank is flexible so that it may transmit a seismic impulse into the earth resulting from operation of the air guns 20. In the illustrative example the bottom end 78 of the tank 14 is formed by a strong, flexible and stretchable diaphragm of resilient material, for example of material such as rubber, or preferably polyurethane plastic, capable of supporting the liquid mass within the tank and yet capable of conforming to the earth.

This flexible diaphragm extends across the bottom of the tank like a slack drumhead and is rested down upon the ground at the geographical location at which the intense seismic sound impulses are intended to be transmitted into the earth. The perimeter of this diaphragm 78 is clamped between a clamp ring 80 and an annular flange 84 on the bottom of the tank 12 by means of a plurality of bolts 82.

The tank 14 is shown substantially full of liquid 18 so that the three air guns 20—20' (only two of them are seen in FIG. 8) are submerged. To increase the power or intensity of the seismic waves transmitted into the earth, the air gun repeaters 20—20 are suspended as low in the tank 14 as possible so as to position their gas release ports 86 as near the diaphragm 78 as possible while leaving sufficient clearance between the repeater air guns and diaphragm 78 to prevent contact between them and the diaphragm. Contact between a repeater air gun 20 and the diaphragm 78 can cause the air gun to puncture or tear the diaphragm 78. The weight 76 serves to increase the intensity or strength of the seismic impulse transmitted into the earth.

As indicated above, the air guns 20 are capable of suddenly releasing a large quantity of confined, highly compressed gas. When this gas is abruptly released into the liquid 18 surrounding each air gun in the tank, a powerful impulse is generated in the liquid, and a large proportion of this impulse is transmitted through the diaphragm 78 into the earth. These impulses are extremely powerful and contain powerful low frequency components which have deep earth penetration capability. The high strength of the dome tank wall is desired in view of these huge impulses, especially when as illustrated several air gun repeaters 20—20' are employed in the tank 14. As illustrated in FIG. 7 three air guns 20, 20' and 20'' are mounted about the tank axis 16 with equiangular spacing between them and they are arranged to be simultaneously actuated during surveying or to be individually activated during their initial individual testing.

The rigid mounting of the air gun 20 in the tank 14 is illustrated in FIG. 8. A solenoid valve 88 is connected with a suitable electric line 91 to a firing control mechanism located in the cab 57 of the vehicle 12. The solenoid valve 88 controls the repeater air gun 20 which is supplied with highly pressurized gas, such as compressed air at 2000 pounds per square inch through an air line 89 from a multi-stage, high pressure compressor 93 (FIGS. 1 and 3) located on the vehicle 12. The repeater air gun is mounted from the upper portion of the dome tank 14. The mounting arrangement for the air gun 20 (as well as that for the others) includes a horizontal mounting plate 90 connected by suitable bolts 92 to a horizontal annular flange 94 located on a cylindrical insert 95 welded in a circular opening 97 in the tank wall. The air gun 20 is connected to the plate 90 with a clamp ring 96 and bolts 98. It is noted that the solenoid valve 88 and the air hose 89 attach to top portions of the air gun so as to face on the outside of the tank, even though the operative body portion and ports 86 of the air gun repeater are submerged in the water confined within the tank. Accordingly, O-ring seals or the like may be employed to provide liquid tight sealing.

The dome tank 14 is completely filled with water to form a confined liquid containing chamber 18. Water is supplied through a hose 100 connected to a tubular elbow coupling 102 communicating through a water inlet port 104 with the inside of the tank. A check valve 106 is employed directly opposite the water inlet port 104 and mounted in such manner that the abrupt release of high pressure gas within the tank operates to close the check valve, which thus prevents escape of water through the port 104 and protects the coupling 102 and maintains liquid confinement during air gun repeater actuation for enhanced acoustic impulse generation.

The upper portion of the confined chamber 18 communicates with the baffle assembly 74 through a suitable communicating passage in the form of a longitudinal, narrow tube 108. The prime function of the baffle assembly 74 is to permit the escape of air or other gas after abrupt discharge by the air gun repeaters, while separating the liquid from the gas so as to return the liquid through the port 104. The tube 108 is of relatively small cross section to present a substantial liquid flow resistance path to maintain effective confinement of the liquid within the tank.

The output from the tube 108 terminates at the periphery of a first baffle chamber 110 closed by a generally horizontally flat first baffle plate 112 provided with a central tubular opening 114. The output end 109 of the conduit 108 is bent over into a horizontal tangential relationship with the periphery of the chamber 110. Thus, the liquid swirls and centrifugal force causes it to tend to hug the cylindrical wall 74 while the gas separates and escapes up the central passage 114. This latter tubular opening 114 communicates with the center of a second baffle chamber 116 of substantially smaller size than the first chamber 110. The second chamber 116 in turn communicates with the perimeter of a somewhat slightly larger third baffle chamber 118 through a series of hooded openings 120 in a second baffle plate 122. These latter openings are formed by right angle elbow pipes 124 which cause the liquid to swirl again in the third chamber 118. Thus, the liquid tends to remain near the periphery of the chamber 118 while the gas escapes up through a central tubular port 119.

As shown in the adjacent view of FIG. 9, the tangential discharge nozzles formed by the elbow pipes 124 are uniformly angularly distributed about the axis 16. Several of these baffle plates and liquid-swirl centrifugal separator baffle chambers, as well as tangential discharge nozzles are stacked over one another with a top baffle chamber 126 provided with a gas escape port 128 in a top end plate 129. The tortuous path and multiple centrifugal separator baffle chambers from the tank chamber 18 to the atmospheric escape port 128 effectively traps any liquid in the baffle chambers for eventual return through peripheral drainage passages 131 to the first baffle chamber 110 where at the bottom it may flow through the conduit 102 for return to the tank through the port 104 and check valve 106.

Around the baffle assembly 74 is placed a cylindrical weight assembly formed of large and heavy annular rings 130 to impart a large mass to the entire seismic wave generator apparatus 10. The rings 130 are held together with bolts 132 arranged about the axis 16, and the entire weight assembly is seated upon an annular flange 134 welded to the external wall 136 of the baffle assembly. Since the cylindrical wall 136 of the baffle assembly bears the massive weight 76 and impulse action from the air guns, it is formed of a very heavy gauge metal. The top of the baffle assembly is provided with a welded-on end plate 129 of substantial massive construction. This end plate 129 in turn is connected to the pivot mounting provided with pivot 69 and a heavy gauge support assembly 72.

In order to strengthen the dome chamber wall 14 a plurality of thick, heavy strong gusset plates 133 are provided. These gusset plates have arcuate lower surfaces conforming to the shape of the exterior surface of the dome wall 14 and are welded to the wall 14 and to the lower weight 130 and to the baffle chamber wall 136. In this preferred embodiment six of these heavy gusset plates are provided, and they extend outwardly and downwardly a major proportion of the distance from the baffle chamber wall 136 toward the rim flange 84.

The impulses released by the air guns are very large. As a result, the entire seismic wave generator 10, although heavily weighted with the weight 76, reacts with a sudden upward jump. If permitted to fall back to earth, the impact of the generator 10 upon the ground would produce a secondary seismic wave which would render the surveying of the site more difficult. Consequently, as the seismic wave generator jumps up, the support structure catches it and prevents it from falling. This catching action imposes high loads on the support structure 22. Moreover, the coupling of impulses from the dome chamber 18 through the support structure 22 to the vehicle could impose large mechanical shocks upon the vehicle as well as operating equipment located in the cab 57 or on the bed of the truck. The support structure 22 is, therefore, attached to the vehicle at axis 28 through the large shock absorber assembly 36. (Shown in detail in FIG. 4).

Figure 4:
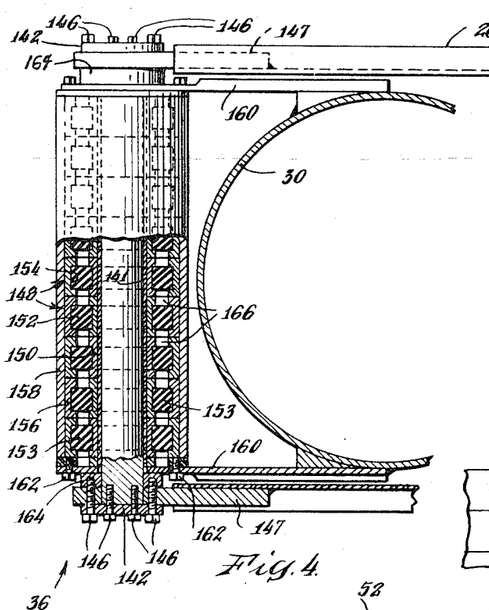
FIG. 4 is an enlarged partial sectional view of the shock absorber assembly used with the mobile survey system of FIGS. 1–3 taken along the line 4—4 in FIG. 3.

As shown in FIG. 4, the ends of the channel shaped arms 26 of the support structure 22 are suitably arranged to support a heavy solid shaft 140 coaxially with the pivot axis 28. The shaft 140 is captured between the arms 26 by a pair of covers 142 with minimum axial and radial play. The shaft 140, covers 142, and arms 26 are firmly affixed to each other with bolts 146 and with a stiffener plate 147 welded to each arm 26. Hence, a pivot action of the arms 26 about the pivot axis 28 (see FIG. 1) causes a like pivoting of the entire shaft 140.

The shaft 140 is supported by the vehicle support structure 30 through a plurality of shock absorber assemblies as 148 in the form of sleeves and rubber rings mounted coaxially with the shaft 140 and axially stacked adjacent each other. Each assembly 148 is formed of an inner sleeve 150 mounted coaxially about a bearing sleeve 141 on shaft 140, the sleeve 150 having an outer annular recess 152 sized to retain an annular resilient shock absorbing element 153 made of a material such as rubber. The annular shock absorbing element 153 fits within an annular radially inwardly facing recess 154 formed in an outer sleeve 156. The bearing sleeve 141 is of bronze or similar bearing material surrounding the shaft 140 adjacent thereto.

Each of the outer sleeves 156 fit in a cylindrical mounting 158, the axial ends of which are firmly affixed to bracket plates 160 welded to the vehicle support structure 30. The cylindrical mounting 158 is mounted to the brackets 160 with bolts 162 distributed around the end of the cylindrical mount. Large spacer washers 164 are employed to prevent axial play between the arms 26 and the bracket plates 160. It is noted that there are clearances such as at 166 adjacent the rubber rings 153. This clearance 166 provides the space for shock absorbing action of the assembly during operation of the seismic wave generator apparatus 10.

It is noted that the support column 30 is in the form of a large rigid cylindrical column. The ends of this column are covered thus forming a large tank, which can conveniently be used to store diesel fuel, water, or compressed air. Also, if desired the gas escape port 128 (FIG. 8) can be connected by a hose to the interior of the tank column 30 which may contain additional baffle separation chambers, such as those shown in FIGS. 8 and 9 within the baffle assembly 74. In such an arrangement the separated liquid is returned through a hose 100 to the conduit 102. The conduit 102 may be made of transparent plastic material so that it can also serve as a liquid level gauge.

The lower end of the column 30 is secured to a pair of strong cross beams 171 and 172 which are fastened to a pair of longitudinal beams 173 (FIG. 2) and 174 (FIG. 1). These beams 171, 172, 173 and 174 form a base frame which can be conveniently mounted on the bed of a truck or other vehicle.

FIG. 10 illustrates the hydraulic cylinder 42 containing piston 40 connected by the shaft 38 to the support assembly 22. The piston 40 divides the cylinder 42 into two chambers 200 and 202. Chamber 200 communicates through a conduit 204 to a hydraulic fluid supply reservoir 206 located on the vehicle 12. The reservoir 206 supplies hydraulic fluid through a conduit 208 and a filter 210 to a hydraulic pump 48 driven by drive means 49 on an engine 50. The pump 48 provides pressurized hydraulic fluid to a pressure line 209 which is selectively connected through a manually controlled valve 212 and a line 214 to the second chamber 202 of the cylinder 42. The controll valve 212 has an outlet port 216 to return pumped hydraulic fluid to the reservoir through line 218. This valve 212 is controlled with a hand lever 220. A counter clockwise positioning of lever 220 into the position labelled, "Lower for seismic operation", effectively diverts pressurized fluid away from the conduit 214, the fluid being pumped through the port 216 and through return line 218 back into the reservoir 206.

Thus, with the lever 220 in the "Lower for seismic operation" position, the seismic wave generator apparatus 10 is lowered onto the earth by allowing the hydraulic fluid in the second cylinder chamber 202 to flow through the line 214, through a rate-of-descent manual control valve 228 and through a solenoid valve 226 and through an interconnection line 224 and through line 204 into the first chamber 201. By increasing the fluid flow through the hand valve 228, the wave generator apparatus 10 is allowed to descend more rapidly onto the earth, and vice versa.

When the lever arm 200 is placed in the position as indicated by full lines in FIG. 10, i.e. the "Raise" position, the pump 48 provides fluid through the conduit 214 to the second chamber 202 in the cylinder 42, thus driving the piston 40 towards the left in the drawing and raising the seismic wave generator apparatus 10.

A bypass valve 222 is provided to shunt fluid flow to the return line 218 when pressure in the chamber 202 builds up too high.

As explained above, the conduit 224 provides communication between the first and second chambers 200 and 202 through the solenoid controlled valve 226 and flow rate control valve 228. The solenoid valve 226 is controlled through an electrical circuit including a switch 227 ganged to the lever 220 as indicated by the dashed line 229. With the lever 220 in the "Raise" position as shown by full lines, the switch 227 is opened thereby de-energizing the solenoid valve 226, thereby maintaining the latter closed to prevent fluid flow through conduit 224. When the lever is moved to the counter clockwise "Lower" position, corresponding to the seismic survey operating position, the switch 227 is closed to energize the solenoid valve 226 and permit the passage of hydraulic fluid, as described above, from the second chamber 202 into the first chamber 200 for lowering the apparatus 10 at a rate as controlled by the valve 228.

The controlled raising and lowering operation of the hydraulic lifting system is as follows. Assume that the lever 220 for control valve 212 is oriented in the "Raise" position as shown thereby supplying pressurized fluid to the second chamber 202 of the cylinder 42, driving the piston 40 toward the left and thus raising the boom 24 and seismic wave generator 10. When the lever 220 for control valve 212 is placed in its alternate "Lower" position, hydraulic fluid from the pump 48 is returned to the reservoir 206, through conduit 218, while the piston 40 is permitted to move slowly to the right under gravity action from the weight of the seismic wave generator 10. A slow return of the piston 40 toward the right of the cylinder forces hydraulic fluid from the second chamber 202 through conduit 214, through flow valve 228 and solenoid valve 226, and conduits 224 and 204 into the other chamber 200. As the piston moves toward the right, fluid is drawn through line 242 and check valve 244 to compensate for change in displacement as the shaft 38 moves out of the cylinder 42. When the seismic wave generator 10 has settled onto the ground, the piston 40 is located near the rear end of the cylinder 42 as shown in the FIG. 3.

As previously mentioned, the actuation of the air gun repeaters 20 produces an upward jump of the seismic wave generator apparatus 10. This upward jump drives piston 40 towards the forward (left) end of the cylinder 42. This movement occurs quickly and is permitted with the opening of a check valve 230 located in the piston 40. The check valve 230 permits hydraulic fluid to freely communicate through passages 232 between the chambers 200 and 202 as the generator apparatus 10 and boom 24 jump upwardly. The check valve 230 is formed of a generally annular ring plate 233 axially movable along guide pins 236 parallel with the shaft 38. When the hydraulic pressure is greater in the rear chamber 202 than in the front chamber 200, the movable ring 233 seals the passages 232.

A sudden upward jump of the seismic wave generator 10 to an elevated position is followed by closure of the check valve 230. Any downward motion thereafter is only possible by the restricted flow of hydraulic fluid through the flow control valve 228. This flow is reduced to a level whereby the seismic wave generator is gently lowered to the ground. Hence, after the air gun repeater operation, the seismic wave generator is effectively "caught" up off of the ground G, followed by a gentle lowering to the ground for subsequent air gun actuation. During the gentle restrained descent of the seismic wave generator 10 air is permitted to escape through the baffle assembly 76.

As indicated in the dotted outline at 10' in FIG. 3, the impulse generator apparatus 10 can be lowered down to a position below the level of the bottom of the rear wheels of the vehicle 12, if desired because of a lower ground elevation G'.

With reference to FIG. 3 the method of operation of the system commences with the placement of the seismic wave generator apparatus 10 upon the ground G after rubble such as rocks and other protrusions are removed from below the diaphragm 78 to avoid its rupture and to provide improved vibration transmission coupling into the earth. The dome chamber 18 (FIG. 8) is filled with water to the level shown in FIG. 8, i.e., with no air pockets remaining to form a fully confined substantially non-compressible mass of liquid in which the air gun repeaters 20, 20' and 20'' are completely submerged. The three air gun repeaters are simultaneously actuated, thereby abruptly releasing into the chamber 18 a large quantity of high pressure gas which creates powerful acoustical waves within the water. Since the liquid is incompressible the impulses travel in all directions therein and are coupled through the diaphragm 78 into the earth below.

After transmission of the powerful seismic waves into the earth, there is an upward jump of the seismic wave generator apparatus 10, as permitted by the check valve 230 (see FIG. 10). A check valve 238 having a passage 240 allows fluid to return into the reservoir 206 to compensate for change in displacement as the shaft 38 moves into the cylinder 42 when the seismic wave generator 10 jumps. The upward motion is slowed both by the weight 76 and by the fluid flow restrictions presented by the passages 232 in the piston 40 (see FIG. 10). The upward motion will terminate at some intermediate position where the generator 10 is effectively caught by the closure of the check valve 230 (see FIG. 10) and restrained from falling back with a bounce upon the ground.

The subsequent gradual lowering of the seismic wave generator 10, as described previously, advantageously provides an opportunity for gases released by the air guns to vent through the baffle assembly 74 and allows the agitated liquid to subside so that upon settlement of the seismic wave generator 10 onto the ground, another seismic wave may be soon generated at the same ground location. The cycle may be repeated 50 or more times at the same location if desired.

In this way, by repeating the transmission of similar seismic impulses into the earth at the same location a large number of reflected and refracted vibrational waves can be sensed and recorded by multiple geophones located at various distances. Accordingly, a large effective signal-to-noise ratio is provided, enabling an effective, and deep penetration survey to be made.

Advantageously, the system can be used on hard ground, soft ground, marshy or swampy ground or submerged ground, i.e. under several feet of water, as these conditions are encountered during a survey. In my experimentation with this system, I have observed that the harder the ground, the higher the wave generator apparatus 10 tends to jump.

In a presently preferred embodiment the seismic wave generator apparatus 10 has a "footprint" area of engagement with the ground which is 80 inches in diameter. The dome wall 14 is steel at least 1.0 inch thick, and the six gusset plates 133 are 1.5 inches thick. The combined weight of the bell 14 and the massive weight 76 is 10,000 pounds, and the weight of the water in the chamber 18 is an additional 1,500 pounds. The force of the impulse transferred into the ground by the apparatus 10 is so great that in spite of the total weight of 11,500 pounds this apparatus 10 will jump about three feet into the air when operated on hard ground.

FIG. 11 on reduced scale shows a presently preferred diaphragm structure including a flexible, stretchable diaphragm 78 of polyurethane having a diameter of about 80 inches with an annular reinforcement skirt 78A which is 18 inches wide and extends around beneath and adjacent to the diaphragm 78. The perimeter of the annular skirt 78A is clamped against the diaphragm by the ring 80, flange 84 and by bolts 82. This annular reinforcement skirt 78A serves to prevent the diaphragm 78 from unduly bulging outwardly beneath the clamp ring 80. A presently preferred thickness of the polyurethane diaphragm 78, when the flange 84 is 80 inches in diameter, is in the range from three-sixteenths to one-half inch in thickness, and the thickness of the polyurethane skirt 78A is in the range from one-fourth to five-eighths inch in thickness, the skirt usually being slightly thicker than the diaphragm.

I claim:

1. Seismic wave generator apparatus for transmitting powerful seismic vibrations into the earth of the type comprising a tank having a bottom adapted for vibration-transmitting coupling with the ground and having a rigid wall at the sides, said tank containing a substantially incompressible liquid, and at least one air gun repeater positioned within the liquid in the tank and capable of repetitively abruptly releasing presssurized gas into the liquid to generate powerful acoustical impulses to be coupled into the ground through the liquid mass and tank bottom, wherein the improvement comprises: said tank being massively weighted, having a rigid wall at the top, and being completely filled with the incompressible liquid to intensify the impulse coupled into the ground upon abruptly releasing pressurized gas into the liquid, the wave generator apparatus being arranged to remove released gas from the tank and to refill the tank with the incompressible liquid for generation of the next impulse by means of gas-liquid separation means located outside the tank for separating the released gas from the liquid expelled therewith, a continuously open flow-restraining passage through the top of the tank providing continuous communication between the interior of the tank and said gas-liquid separation means for conducting passage of the gas-and-liquid mixture expelled by said released gas, said flow-restraining passage having a small cross-section to present a substantial liquid flow resistance path to maintain effective confinement of the liquid within the tank as the pressurized gas is abruptly released to generate an acoustical impulse, said gas-liquid separation means having means for intercepting the liquid in said gas-and-liquid mixture, and means for returning the separated liquid from said gas-liquid separation means to the interior of said tank to refill the tank with incompressible liquid.

2. Seismic wave generator apparatus for transmitting powerful seismic vibrations into the earth as claimed in claim 1, in which the air gun repeater is mounted with its body containing the discharge port extending into the confined volume within the tank and with its control accessible from outside of the confined volume.

3. Seismic wave generator apparatus for transmitting powerful seismic vibrations into the earth as claimed in claim 1, characterized in that a plurality of air gun repeaters have their discharge ports communicating with the confined volume of liquid at widely spaced locations in the confined volume of liquid.

4. Seismic wave generator apparatus for transmitting powerful seismic vibrations into the earth as claimed in claim 3, characterized in that said air gun repeaters, are positioned such that their discharge ports are equidistant from the bottom surface of the confined volume of liquid.

5. Seismic wave generator apparatus for transmitting powerful seismic vibrations into the earth as claimed in claim 3, and wherein said plurality of air gun repeaters are arranged to be simultaneously actuated during seismic surveying.

6. Seismic wave generator apparatus for transmitting powerful seismic vibrations into the earth as claimed in claim 3, characterized in that the tank is symmetrical about a vertical axis of symmetry and said plurality of air gun repeaters are positioned at locations equiangularly spaced about the axis of symmetry for abruptly releasing the pressurized air or gas into the confined liquid through discharge ports at uniformly spaced locations about the axis within the confined liquid.

7. Seismic wave generator apparatus for transmitting powerful seismic vibrations into the earth as claimed in claim 1, characterized in that said tank is symmetrical about a vertical axis of symmetry and massive weights are attached to the tank in a symmetrical relationship with respect to said vertical axis.

8. Seismic wave generator apparatus for transmitting powerful seismic vibrations into the earth as claimed in claim 1, characterized in that said means for returning the separated liquid to the tank includes check valve means arranged in such manner that abrupt release of pressurized air or gas within the confined liquid volume closes said check valve means to prevent escape of liquid and to maintain liquid confinement.

9. Seismic wave generator apparatus for transmitting powerful seismic vibrations into the earth as claimed in claim 1, characterized in that the tank is dome-shaped and a plurality of strong members are provided having an arcuate lower surface conforming to the dome shape of the dome-shaped tank for strengthening the dome.

10. Seismic wave generator apparatus for transmitting powerful seismic vibrations into the earth as claimed in claim 1, characterized in that a flexible extensible diaphragm extends across the bottom of the tank, and an annular skirt of flexible extensible material extending around beneath the perimeter of said diaphragm.

11. Seismic wave generator apparatus for transmitting powerful seismic vibrations into the earth as claimed in claim 10, characterized in that said diaphragm and said skirt are made of flexible polyurethane.

12. Seismic wave generator apparatus for use in seismic exploration of the type comprising a tank having a diaphragm at the bottom for transmitting seismic energy into the earth, said tank containing a substantially incompressible liquid, and at least one air gun repeater positioned within the liquid in the tank and capable of repetitively abruptly releasing pressurized gas in the liquid to generate seismic energy to be coupled into the ground through the liquid mass and diaphragm, wherein the improvement comprises:

said tank being dome-shaped and having a rigid wall at the sides and top, being symmetrical about a vertical axis of symmetry, and being completely filled with said substantially incompressible liquid to intensify the impulse coupled into the ground upon abruptly releasing pressurized gas into the liquid;

the wave generator apparatus being arranged to remove released gas from the tank and to refill the tank with the incompressible liquid for generation of the next impulse by means of a cylindrical gas-liquid separation means for separating the released gas from the liquid, said separation means extending upwardly from the top of the dome-shaped tank with its cylinder axis on said axis of symmetry, a port in the top wall of the tank providing communication from the interior of the dome-shaped tank to said cylindrical gas-liquid separation means for conducting the passage of the gas-and-liquid mixture expelled by said released gas, said gas-liquid separation means having baffle means for intercepting the liquid in said gas-and-liquid mixture, and means providing a downward flow path for returning the separated liquid from the gas-liquid separation means to the interior of the tank by means of gravitational forces to refill the tank with said liquid.

13. Seismic wave generator apparatus for use in claim 12 wherein a plurality of air gun repeaters are positioned within the tank and are spaced away from the axis of symmetry of the tank and substantially uniformly therearound.

14. Seismic wave generator apparatus for use in seismic exploration as claimed in claim 12, wherein said port in the top of the dome-shaped tank provides an opening into the gas-liquid separation means substantially smaller than the opening provided by the cylindrical cross-section of the gas-liquid separation means.

15. Seismic wave generator apparatus for use in seismic exploration as claimed in claim 12 wherein said gravitational return means for separated liquid includes check valve means arranged in such manner that abrupt release of pressurized gas within the confined liquid closes the check valve means to prevent escape of liquid and to maintain liquid confinement.

16. Seismic wave generator apparatus for use in seismic exploration as claimed in claim 15 wherein said gravitational return means and said check valve means are located at one side of said cylindrical gas-liquid separation means and connect said means with said dome-shaped tank.

17. Seismic wave generator apparatus for use in seismic exploration as claimed in claim 15 wherein said cylindrical gas-liquid separation means comprises baffles arranged to subject the gas-and-liquid mixture to a centrifugal swirling action about the axis of symmetry to rapidly separate the liquid from the released gas.

18. Seismic wave generator apparatus for use in seismic exploration as claimed in claim 17 wherein the baffles provide a tortuous twisting path for the gas-and-liquid mixture for venting the gas while the separated liquid returns along multiple direct paths to be returned to the interior of the tank.

19. A method for generating and transmitting powerful seismic vibrations into the earth of the type comprising inserting incompressible liquid into a tank having a vibration-transmitting bottom and a rigid wall at its sides, positioning the tank with its bottom in vibration-transmitting relationship with the earth, supplying pressurized gas to an air gun repeater positioned within the liquid in the tank, and abruptly releasing the pressurized gas from the air gun repeater into the liquid in the tank to generate a powerful acoustic impulse to be coupled into the ground through the liquid mass and tank bottom, wherein the improvement comprises: massively weighting the tank, providing it with a rigid wall at the top, and completely filling it with said incompressible liquid to intensify the impulse coupled into the ground upon abruptly releasing the pressurized gas into the liquid, and removing the released gas from the tank and refilling the tank with the incompressible liquid by expelling through an open flow-restraining passage in the top wall of the tank the liquid and gas mixture formed upon release of said pressurized gas, intercepting the liquid in said expelled liquid and gas mixture in a liquid-gas separator positioned outside said tank, and returning said separated liquid to the interior of said tank to refill the tank with the incompressible liquid.

20. The method for generating and transmitting powerful seismic vibrations into the earth as claimed in claim 19 wherein said liquid and gas mixture is expelled upwardly into a gas-liquid separator positioned above said tank, and wherein said separated liquid returns gravitationally to the interior of the tank.

21. The method of transmitting powerful seismic vibrations into the earth as claimed in claim 19 characterized in that the pressurized air or gas is abruptly released into the confined volume of liquid from a plurality of discharge ports communicating with the confined volume of liquid at widely spaced locations in the confined volume of liquid.

22. The method of transmitting powerful seismic vibrations into the earth as claimed in claim 21, characterized in that the widely spaced discharged ports are equidistant above the bottom surface of the confined volume of liquid.

23. The method of transmitting powerful seismic vibrations into the earth as claimed in claim 19, characterized by the step of applying separate massive weight on the confined volume of liquid for increasing the intensity of the seismic vibrations transmitted into the earth.

24. The method of transmitting powerful seismic vibrations into the earth as claimed in claim 19, characterized in that the liquid in the liquid-gas separator is subjected to swirling centrifugal action to rapidly separate the liquid from the released air or gas.

25. The method of transmitting powerful seismic vibrations into the earth as claimed in claim 24, characterized in that the air or gas and liquid is transmitted through a tortuous twisting path for venting the air or gas while the separated liquid returns along multiple direct paths to be returned promptly to the confined volume.

* * * * *